US012005850B2

(12) United States Patent
Nakajima et al.

(10) Patent No.: US 12,005,850 B2
(45) Date of Patent: Jun. 11, 2024

(54) AIRBAG DEVICE

(71) Applicants: AUTOLIV DEVELOPMENT AB, Vargarda (SE); Yutaka Nakajima, Kanagawa (JP); Yoshiki Ito, Kanagawa (JP)

(72) Inventors: Yutaka Nakajima, Kanagawa (JP); Yoshiki Ito, Kanagawa (JP)

(73) Assignee: Autoliv Development AB, Vargarda (SE)

( * ) Notice: Subject to any disclaimer, the term of this patent is extended or adjusted under 35 U.S.C. 154(b) by 0 days.

(21) Appl. No.: 18/004,012

(22) PCT Filed: Jun. 15, 2021

(86) PCT No.: PCT/JP2021/022671
§ 371 (c)(1),
(2) Date: Dec. 30, 2022

(87) PCT Pub. No.: WO2022/009622
PCT Pub. Date: Jan. 13, 2022

(65) Prior Publication Data
US 2023/0294629 A1    Sep. 21, 2023

(30) Foreign Application Priority Data

Jul. 7, 2020   (JP) ................................ 2020-116911

(51) Int. Cl.
*B60R 21/207*    (2006.01)
*B60R 21/233*    (2006.01)
(Continued)

(52) U.S. Cl.
CPC .......... *B60R 21/207* (2013.01); *B60R 21/233* (2013.01); *B60R 21/235* (2013.01);
(Continued)

(58) Field of Classification Search
CPC .... B60R 21/231; B60R 21/207; B60R 21/233
See application file for complete search history.

(56) References Cited

U.S. PATENT DOCUMENTS

| 3,953,049 A | 4/1976 | Surace et al. |
| 10,189,431 B2 * | 1/2019 | Yamamoto ............ B60R 21/237 |

(Continued)

FOREIGN PATENT DOCUMENTS

| CN | 112339698 A | * | 2/2021 | ........... B60R 21/207 |
| CN | 115667021 A | * | 1/2023 | ........... B60R 21/207 |

(Continued)

*Primary Examiner* — Nicole T Verley
(74) *Attorney, Agent, or Firm* — Harness, Dickey & Pierce, P.L.C.; Stephen T. Olson

(57) ABSTRACT

An airbag that prevents heavy interference with the head of an occupant during expansion and deployment even when the occupant is not seated in a vehicle seat in a regular position is configured to be positioned to the sides of the center in the left-right direction of a vehicle seat and has a pair of chambers physically coupled by a coupling section that deploy forward of the occupant when expansion and deployment are complete. The pair of chambers are independent during expansion and deployment and expand and deploy frontward from both the left and right sides of the vehicle seat, having side protecting chambers that cover at least the side sections of the occupant. The side protecting chambers are coupled by coupling sections positioned to the sides of the center in the left-right direction of the vehicle seat, and the coupling section is thinner than the side protecting chambers at least during initial expansion and deployment.

17 Claims, 16 Drawing Sheets

(51) Int. Cl.
    *B60R 21/235*     (2006.01)
    *B60R 21/239*     (2006.01)
    *B60R 21/00*     (2006.01)
    *B60R 21/16*     (2006.01)

(52) U.S. Cl.
    CPC .... *B60R 21/239* (2013.01); *B60R 2021/0041* (2013.01); *B60R 2021/0044* (2013.01); *B60R 2021/0048* (2013.01); *B60R 2021/0058* (2013.01); *B60R 2021/161* (2013.01); *B60R 2021/23316* (2013.01); *B60R 2021/23509* (2013.01)

(56) References Cited

U.S. PATENT DOCUMENTS

| | | | |
|---|---|---|---|
| 11,338,757 B2 * | 5/2022 | Hagg | B60R 21/207 |
| 2013/0015642 A1 | 1/2013 | Islam et al. | |
| 2016/0121839 A1 | 5/2016 | Ko et al. | |
| 2020/0101923 A1 * | 4/2020 | Kim | B60R 21/23138 |
| 2021/0009074 A1 * | 1/2021 | Wold | B60R 21/2334 |

FOREIGN PATENT DOCUMENTS

| | | | | |
|---|---|---|---|---|
| DE | 102009040641 A1 | * | 4/2010 | B60N 2/888 |
| DE | 102019115253 A1 | * | 5/2020 | B60N 2/002 |
| EP | 3290275 A1 | * | 3/2018 | B60R 21/207 |
| EP | 3536563 A1 | * | 9/2019 | B60R 21/207 |
| EP | 3581441 A1 | * | 12/2019 | B60R 21/207 |
| EP | 3772438 A1 | * | 2/2021 | B60R 21/207 |
| EP | 3792119 A1 | * | 3/2021 | B60R 21/207 |
| EP | 4011710 A1 | * | 6/2022 | B60R 21/01 |
| EP | 4159552 A1 | * | 4/2023 | B60R 21/207 |
| JP | 2007-230396 A | | 9/2007 | |
| JP | 2017030373 A | * | 2/2017 | B60R 21/207 |
| JP | 2017-185978 A | | 10/2017 | |
| JP | 2018-83554 A | | 5/2018 | |
| JP | 2019-14477 A | | 1/2019 | |
| WO | 2016/174785 A1 | | 11/2016 | |
| WO | WO-2016174785 A1 | * | 11/2016 | B60R 21/207 |
| WO | WO-2020080747 A1 | * | 4/2020 | B60R 21/207 |
| WO | WO-2021029197 A1 | * | 2/2021 | B60R 21/01 |
| WO | WO-2021070592 A1 | * | 4/2021 | B60N 2/427 |
| WO | WO-2021241126 A1 | * | 12/2021 | B60R 21/207 |

* cited by examiner (a)

(b)

(a)

(b)

(a)

(b)

(a)

(b)

(a)

(b)

AIRBAG DEVICE

TECHNICAL FIELD

The present invention relates to an airbag device that, for example, integrally protects the head of an occupant and the side sections of the shoulders, upper arms, and chest of the occupant during a vehicle collision, and in cases where such is necessary, is also capable of protecting locations in addition thereto including the side sections of the abdomen and waist.

Hereinafter, in the present application, "above" and "upper" mean the head direction of an occupant in a regular seating position seated in a vehicle seat, and "below" and "lower" mean the foot direction of the occupant in the same position. Moreover, "front" and "forward" refer to the front direction of the occupant seated in a vehicle seat in the regular condition, while "rear" and "rearward" similarly refer to the back direction of an occupant seated in the same position. Moreover, "left" and "left side" refer to the left-hand direction of the occupant seated in the vehicle seat in the regular condition, while "right" and "right side" similarly refer to the right-hand direction of the occupant in the same position. Note that "regular state" in the above description refers to a position in which the entire back of an occupant is in contact with a backrest section of a seat and centered in the width direction of a seat cushion constituting the seat.

BACKGROUND TECHNOLOGY

In recent years, airbag devices have been proposed, for example, where a hood-type (shell-shaped) airbag, which expands and deploys from a stowing portion of a vehicle seat during a vehicle collision, protects an occupant by integrally covering the head of the occupant and the side sections of the shoulders, upper arms, and chest of the occupant (for example, see Patent Documents 1 and 2).

The airbags proposed in Patent Documents 1 and 2 exhibit the functions and effects described in Patent Documents 1 and 2 when an occupant is seated in a vehicle seat in the regular position.

However, occupants do not necessarily always sit in vehicle seats in the regular position and may be seated in a position shifted from the regular position to one side in the left-right direction. Moreover, the upper half of the occupant seated in the vehicle seat may be leaned forward. In such a case, when there is interference of a chamber with the occupant (head in particular) during expansion and deployment of an airbag, expected deployment performance may not be obtained depending on the level of interference.

In addition, as illustrated in FIG. 9, this type of airbag 1 is stowed, for example, rolled in a roll shape in which an upper portion extends from a first side portion of a frame 2b supporting a backrest section 2a of a vehicle seat 2 to a second side portion. Specifically, a head protecting chamber 1 aa that constitutes chamber 1a formed by the airbag 1 is stowed in an upper portion of the backrest section 2a, and side protecting chambers 1ab that constitute the chamber 1a are stowed in a position mutually opposite and separated from both the left and right sides of the backrest section 2a. Note that the upper portion of the backrest section 2a refers to an upper portion of headrest 2c when the vehicle seat 2 is formed integrally with the headrest 2c as illustrated in FIG. 9(b).

For example, as illustrated in FIG. 10A, the airbag 1 has a form longer in the left-right direction than in the up-down direction when the airbag 1 is spread out uninflated and laid flat on a flat surface, and by performing sewing 4 and 5—in a state where two base fabrics 1b and 1c having a same form are overlapped—on an outer periphery and the center in the left-right direction, the chambers 1a, which can expand to a same form on the left and right of the sewing 5, are formed.

In the airbag 1, insertion sections 1e of inflators 6 are formed at respective outside lower portions of the chambers 1a on the left and right, being configured such that gas is supplied separately by the inflators 6 to the chambers 1a on the left and right, and the chambers 1a on the left and right are fluidly independent.

In addition, providing the chambers 1a on the left and right with an appropriate number of non-expanding sections 1d in a center portion thereof in the left-right direction demarcates the respective side protecting chambers 1ab positioned at both ends on the left and right of the airbag 1 and the head protecting chamber 1 aa positioned at a center portion in the left-right direction of the airbag 1.

Therefore, gas supplied from the inflators 6 expands the side protecting chambers 1ab and, being supplied to the side protecting chambers 1aa mutually between the non-expanding sections 1d as well as between the non-expanding sections 1d and the sewing 4 on the outer periphery, expands the head protecting chamber 1aa. Note that in FIG. 10A, 1f illustrates non-expanding sections provided on the side protecting chambers 1ab.

PRIOR ART DOCUMENTS

Patent Documents

Patent Document 1: Japanese Unexamined Patent Application 2019-14477
Patent Document 2: Japanese Unexamined Patent Application 2018-83554

SUMMARY OF THE INVENTION

Problem to be Solved by the Invention

For example, when the airbag 1 illustrated in FIG. 10A is stowed in a state rolled in a roll shape as illustrated in FIG. 9, chambers 1a expand in a state such as illustrated in FIG. 10B when expansion and deployment of the airbag 1 is complete. Therefore, when an occupant 3 is not seated in a vehicle seat 2 in a regular position, there is severe interference between a head 3a of the occupant 3 and a head protecting chamber 1aa that covers the head 3a during initial expansion and deployment (see FIG. 10C(a)), causing insufficient deployment of the airbag 1 forward of the occupant 3 when expansion and deployment are completed and making proper protection of the occupant 3 impossible (see FIG. 10C(b)).

A problem to be solved by the present invention is, for example, the inability to obtain expected deployment performance depending on a level of interference when there is interference between an occupant and a chamber during expansion and deployment of an airbag when a seated position of an occupant is shifted to one side in the left-right direction.

The present invention resolves the issue described above. Specifically, an object of the present invention is to enable expected deployment performance to be obtained without interference between an airbag and the head, in particular, of an occupant during expansion and deployment even when the occupant is not seated in a vehicle seat in a regular position, such as when the occupant is seated in a position that is shifted to one side in the left-right direction.

Means for Solving the Problems

In other words, the present invention is an airbag device including an airbag that expands and deploys to integrally cover the head and side portions of an occupant seated on a vehicle seat, and an inflator that supplies gas to the airbag.

The airbag has a pair of chambers positioned to the sides of the center in the left-right direction of the vehicle seat, which are physically coupled by a coupling section that deploys forward of the occupant when expansion and deployment are completed. Furthermore, the pair of chambers are each independent during expansion and deployment, having side protecting chambers that expand and deploy frontward from both the left and right sides of the vehicle seat and cover at least side sections of the occupant.

In the present invention, the side protecting chambers are coupled by the coupling section, being configured such that the coupling section is thinner than the side protecting chambers at least during initial expansion and deployment.

In the present invention, "during initial expansion and deployment" refers to the airbag being positioned to the sides of the center in the left-right direction of the vehicle seat following initial expansion and deployment, and the coupling section, which deploys forward of the occupant when expansion and deployment are complete, passing over the crown of the head of the occupant.

In the present invention, the coupling section, which couples the side protecting chambers at the sides of the center in the left-right direction of the vehicle seat, is configured to be thinner than the side protecting chambers at least during initial expansion and deployment. Therefore, for example, even when the seated position of the occupant is shifted to one side in the left-right direction, the coupling section can be suppressed from heavily interfering with the head of the occupant during initial expansion and deployment of the airbag, so expected deployment performance can be obtained.

In the present invention, in a configuration in which "the coupling section is thinner than the side protecting chambers", in addition to a configuration in which the coupling section forms a non-expanding section, for example, there is a configuration in which delay chamber sections are connected to the side protecting chambers via inner vents. Additionally, there is also a configuration having both the non-expanding section and the delay chamber sections. With these configurations, there will most likely not be interference between the coupling section and the head of the occupant, in particular, during initial expansion and deployment of the airbag.

When the coupling sections are set as delay chamber sections, gas is supplied to the delay chamber sections via the side protecting chambers, so expansion and deployment of the delay chamber sections is more temporally delayed than expansion and deployment of the side protecting chambers. The length of the temporal delay of the delay chamber sections can be controlled, for example, by changing the size of the inner vents.

In the present invention, the delay chamber sections include, for example, a left-right pair of expanding sections, and may be such that gas from the inner vents, provided to the sides of the center in the left-right direction of the vehicle seat in the side protecting chambers, is supplied to the expanding sections.

Specifically, the airbag is composed of at least two base fabrics, and an independent seam formed either not joining with an outer peripheral seam or formed joining with the outer peripheral seam at respective boundaries of the side protecting chambers and the delay chamber sections. Furthermore, in the case that the outer peripheral seam does not join with the independent seam, gaps between the independent seam and the outer peripheral seam form the inner vents. On the other hand, in the case that the outer peripheral seam does join with independent seam, gaps serving as the inner vents are formed in the independent seam. In these cases, non-expanding sections may be formed to the sides of the center in the left-right direction of the independent seam by further forming a seam that joins with the outer peripheral seam.

Alternatively, the airbag is configured having two base fabrics that form the side protecting chambers and, among these two base fabrics, an additional base fabric that forms the delay chamber sections, which will be on the occupant side or on the side opposite the occupant during expansion and deployment. Furthermore, the inner vents are provided at portions of the base fabric, which will be on the occupant side or on the side opposite the occupant during expansion and deployment and which are covered by the additional base fabric. In this case, the two base fabrics that form the side protecting chambers may form the non-expanding sections.

Effect of the Invention

In the present invention, at least during initial expansion and deployment, the coupling section, which couples the side protecting chambers that cover the side sections of the occupant during initial expansion and deployment and which are positioned to the sides of the center in the left-right direction, is configured to be thinner than the side protecting chambers. Therefore, even when the seated position of the occupant is shifted to one side in the left-right direction or when the upper half of the seated occupant is leaned forward, the coupling section can be suppressed from heavily interfering with the occupant during initial expansion and deployment, enabling expected deployment performance to be obtained and proper protection of the occupant.

MODE FOR CARRYING OUT THE INVENTION

For example, expected deployment performance may not be able to be obtained depending on a level of interference when there is interference between the head of an occupant, and in particular, a chamber during initial expansion and deployment of the airbag when the seated position of an occupant is shifted to one side in the left-right direction.

In the present invention, at least during initial expansion and deployment, a coupling section, which is positioned to the sides of the center in the left-right direction of the vehicle seat and which is deployed forward of the occupant when expansion and deployment are completed, is configured so as to be thinner than the side protecting chambers that cover at least the side sections of the occupant.

Embodiments of the present invention are described hereinafter using FIG. 1A to FIG. 4C.

Figure 1A:
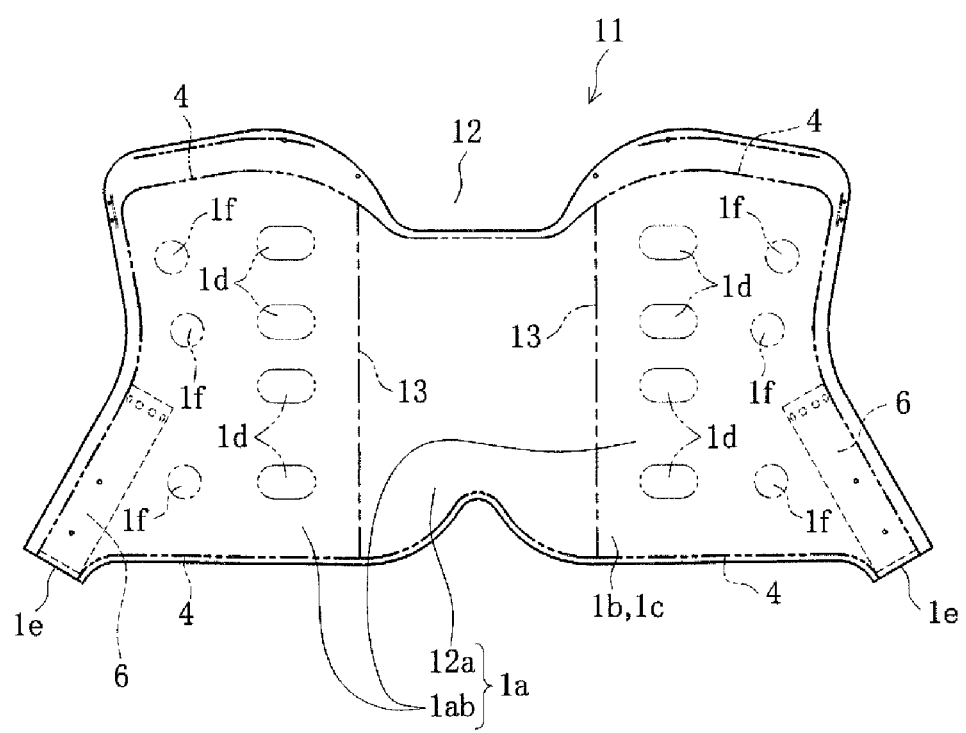
FIG. 1A illustrates Embodiment 1 of the airbag constituting the airbag device of the present invention in an unfolded state (state prior to folding) laid flat on a flat surface.
Figure 1B:
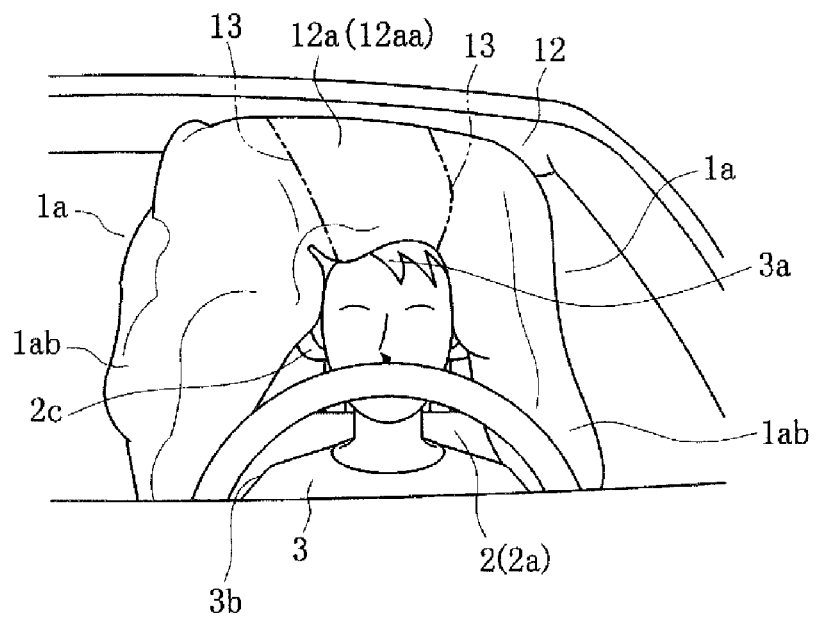
FIG. 1B illustrates the airbag during initial expansion and deployment shown in FIG. 1A, where (a) is a view from the front of the vehicle and (b) is a view of a cross-section of a portion positioned above the head of the occupant.
Figure 1B:
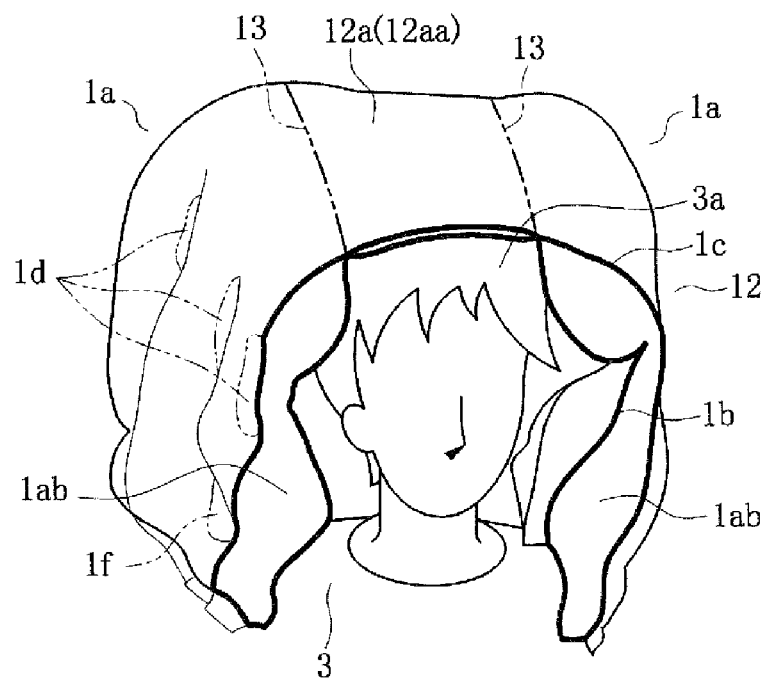
Figure 1C:
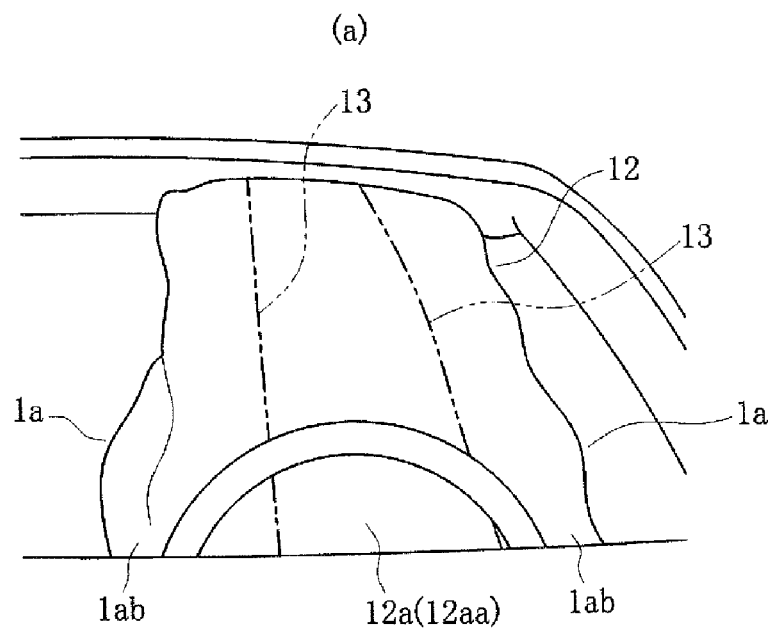
FIG. 1C illustrates the airbag of FIG. 1A when expansion and deployment are completed where (a) is a view from the front of the vehicle and (b) is a view in which the portion that protects the head of the occupant is partially omitted.
Figure 1C:
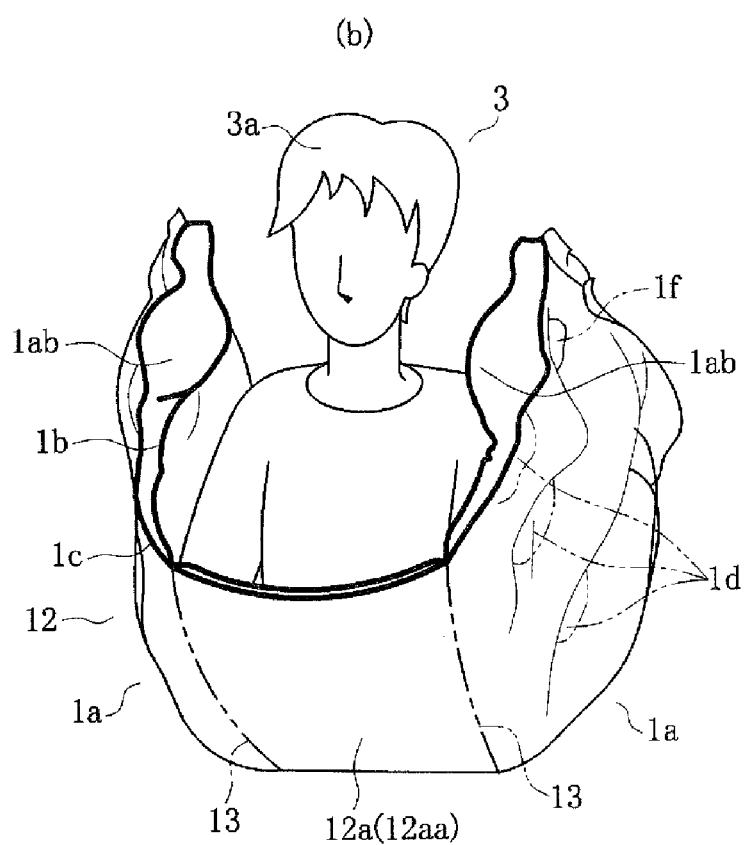

(Embodiment 1: FIG. 1A to FIG. 1C)

An airbag device 11 of the present invention includes: an airbag 12 that expands and deploys to cover, for example, a head 3a of an occupant 3 seated in a vehicle seat 2 as well as side sections 3b of the shoulders, upper arms, and chest of the occupant 3, and an inflator 6 that emits a gas into an inner portion of the airbag 12 in response to a signal from a sensor that detects an impact to the vehicle.

Figure 9:
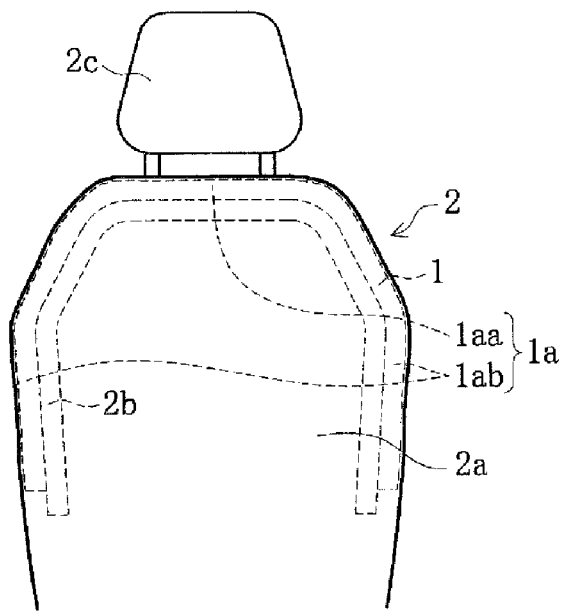
FIG. 9 illustrates a vehicle seat to which the airbag device is attached viewed from the rear of the vehicle, where (a) illustrates a headrest separately attached to the backrest section of the vehicle seat and (b) illustrates a headrest integrally formed with the backrest.
Figure 9:
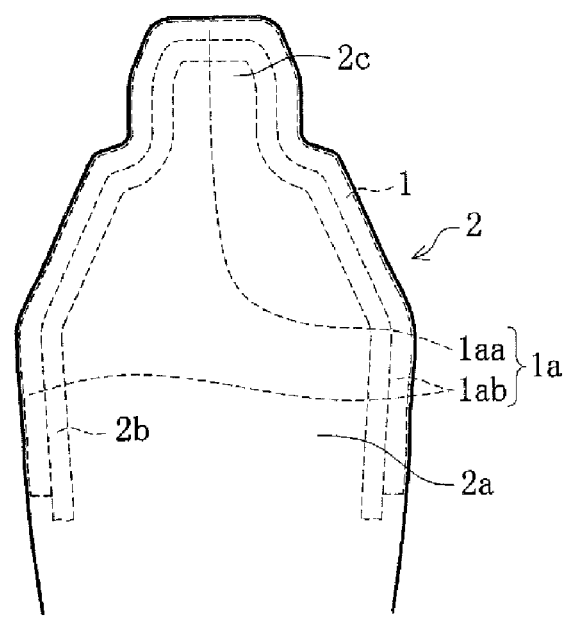

The vehicle seat 2 includes a seat cushion and backrest section 2a. A headrest 2c is integrally formed on the upper section of the backrest section 2a or is attached separately. The seat cushion and the backrest section 2a are supported by a frame 2b (see FIG. 9). Rolling the airbag 12 in a roll shape from a front side toward a rear side in the flat state illustrated in FIG. 1A forms a stowed state for stowing in the backrest section 2a and reduces dimensions in the front-to-back direction. As illustrated in FIG. 9, the airbag 12 is rolled in a roll shape and stowed from a first side portion of the frame 2b supporting the backrest section 2a of the vehicle seat 2, through an upper portion, and across a second side portion.

The airbag 12 has a pair of chambers 1a positioned to the sides of the center in the left-right direction of the vehicle seat 2 and coupled by a coupling section 12a, which deploys forward of the occupant 3 when expansion and deployment are complete. The pair of chambers 1a expand and deploy frontward from both the left and right sides of the vehicle seat 2 and have a pair of side protecting chambers 1ab that cover at least side sections of the occupant 3. As illustrated in FIG. 1A, in the airbag 12, for example, side protecting chambers 1ab and a head protecting chamber 1aa of the airbag 1 described above with reference to FIG. 10A are demarcated by, for example, lines of sewing 13 that join with sewing 4 at an outer periphery, the airbag being configured without sewing 5 in the center in the left-right direction.

Figure 10A:
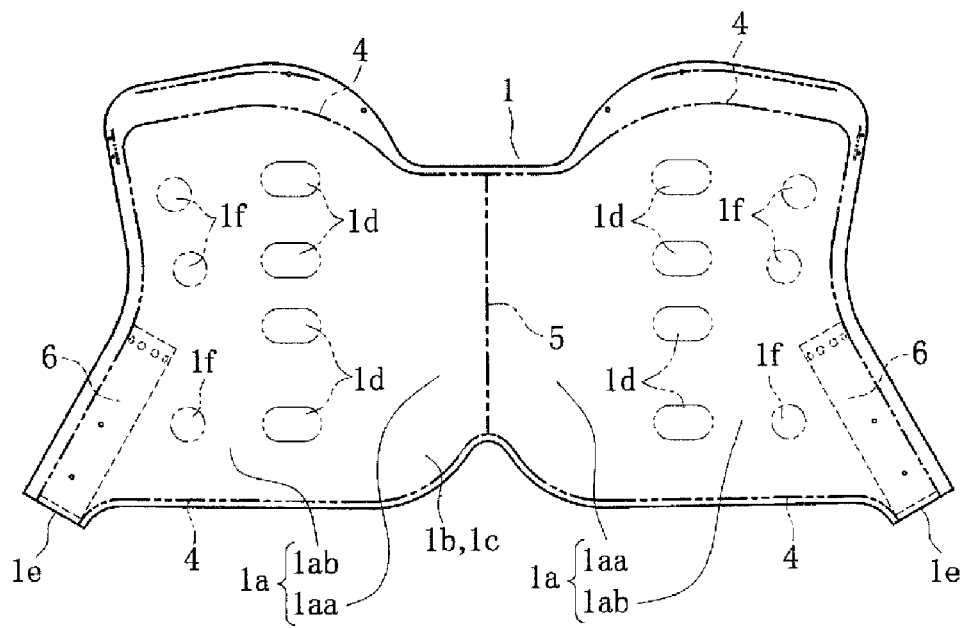
FIG. 10A illustrates an airbag forming a base of Embodiment 1 of the airbag constituting the airbag device of the present invention in an unfolded state (state prior to folding) laid flat on a flat surface.
Figure 10B:
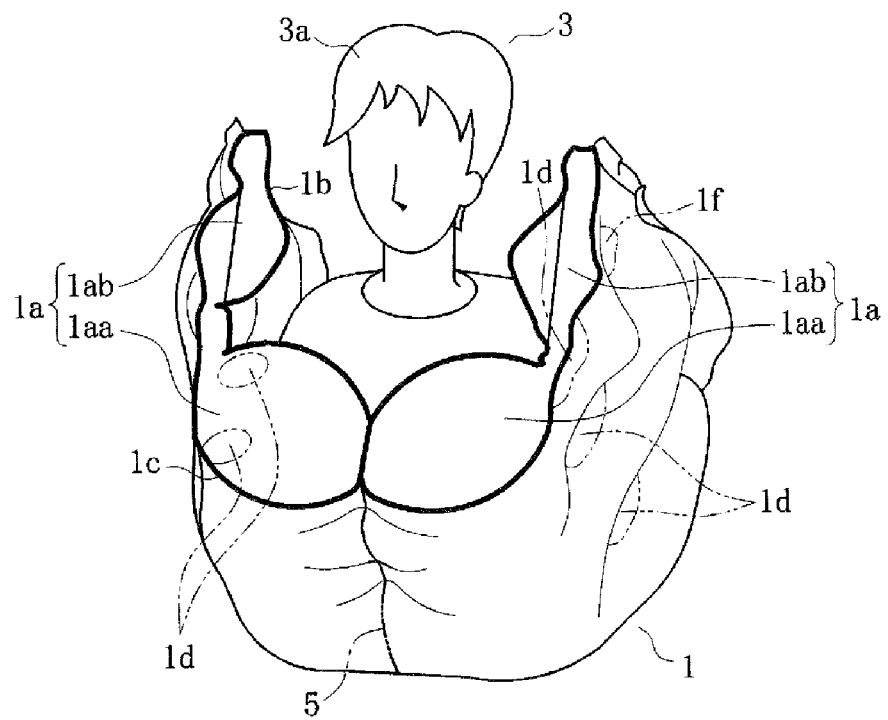
FIG. 10B is a perspective view of the airbag illustrated in FIG. 10A when expansion and deployment are complete, illustrated such that the portion that protects the head of the occupant is partially omitted.
Figure 10C:
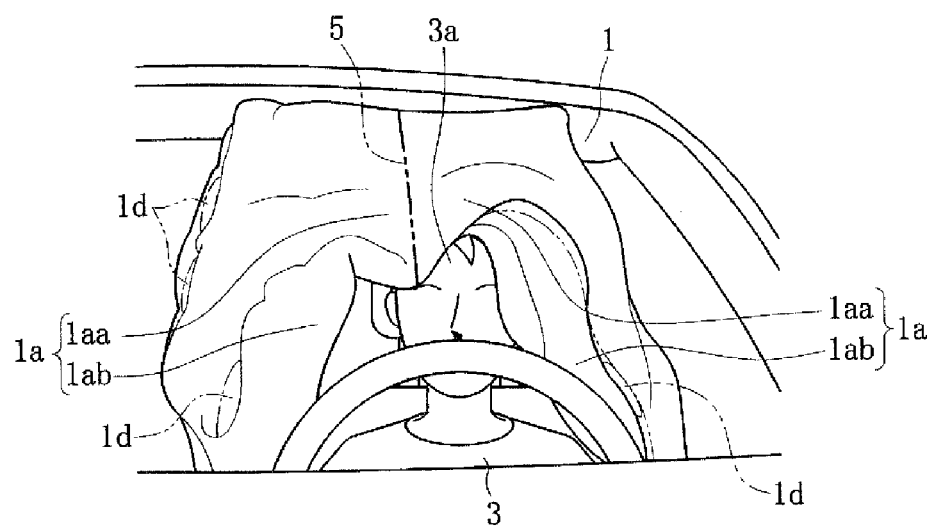
FIG. 10C illustrates the airbag illustrated in FIG. 10A in an expanded and deployed state as viewed from the front of the vehicle, (a) being during initial expansion and deployment and (b) being when expansion and deployment are complete.
Figure 10C:
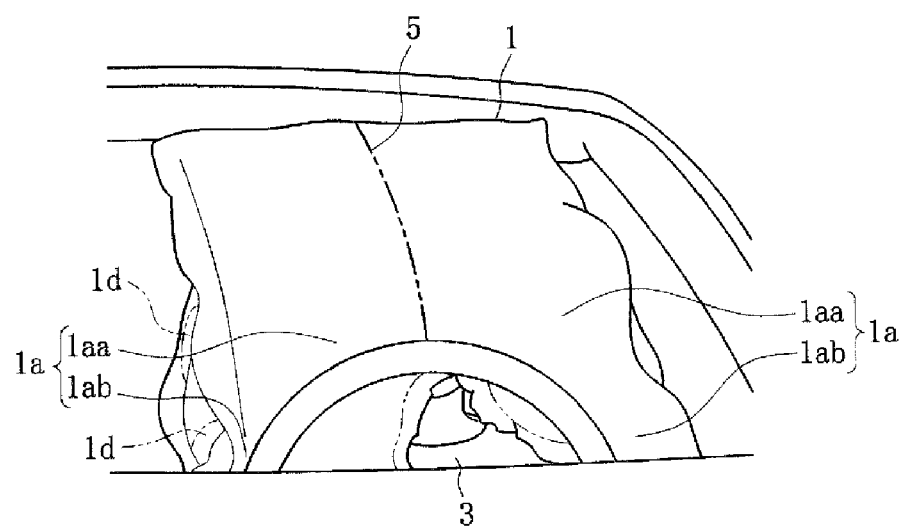

That is, in the airbag 12 illustrated in FIG. 1A, a section corresponding to the head protecting chamber 1aa in FIG. 10A forms the coupling section 12a, and the side protecting chambers 1ab on the left and right are physically coupled by the coupling section 12a. In this case, the coupling section 12a forms a non-expanding section 12aa to which gas is not supplied, so, as illustrated in FIG. 1C(b), the coupling section 12a does not expand even when expansion and deployment of the airbag 12 is complete. Note that for the chambers 1a, the side protecting chambers 1ab, and delay chamber sections 12ab described below, "chamber" refers not only to an inner space, but also to a bag body including a base fabric that forms this inner space.

Therefore, after expansion and deployment of the airbag 12 is started, and during initial expansion and deployment up until the coupling section 12a (non-expanding section 12aa) passes over the head 3a of the occupant 3, there is no interference between the coupling section 12a (non-expanding section 12aa) and the head 3a of the occupant 3 (see FIG. 1B). This is because the entire coupling section 12a is constituted by the non-expanding section 12aa, which is thinner than the side protecting chambers lab. Furthermore, when expansion and deployment of the airbag 12 are complete, the airbag 12 (coupling section 12a) reliably deploys to the front of the occupant 3 and covers the head 3a, allowing expected deployment performance to be obtained (see FIG. 1C).

Figure 2A:
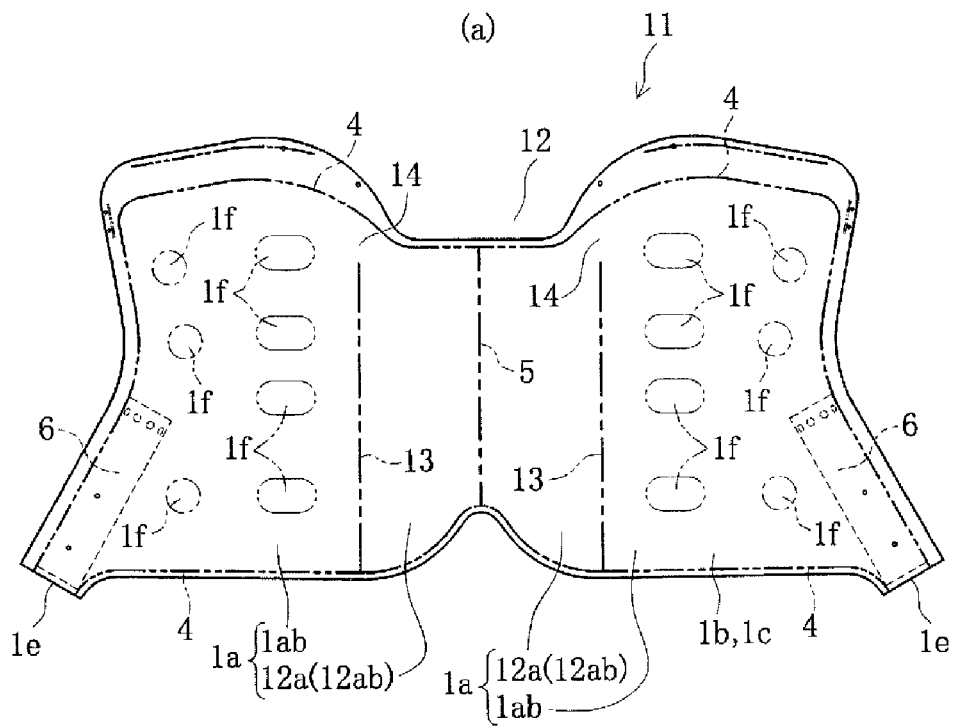
FIG. 2A illustrates Embodiment 2 of the airbag constituting the airbag device of the present invention in an unfolded state (state prior to folding) laid flat on a flat surface, in which in (a), a gap is formed between the independent seam and the outer peripheral seam, and in (b), a gap is formed in the independent seam.
Figure 2A:
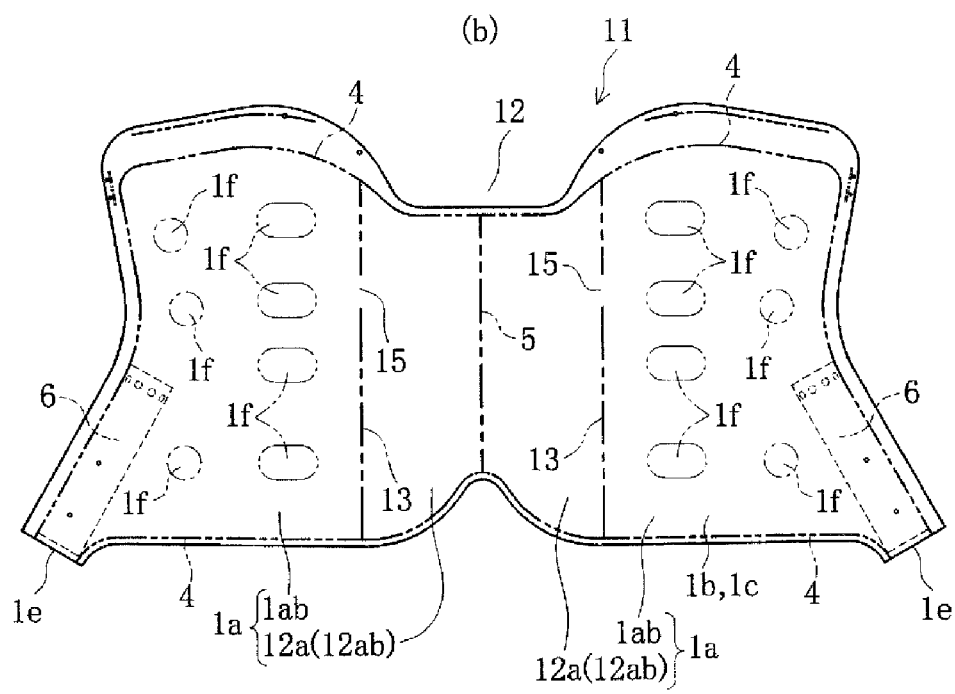
Figure 2B:
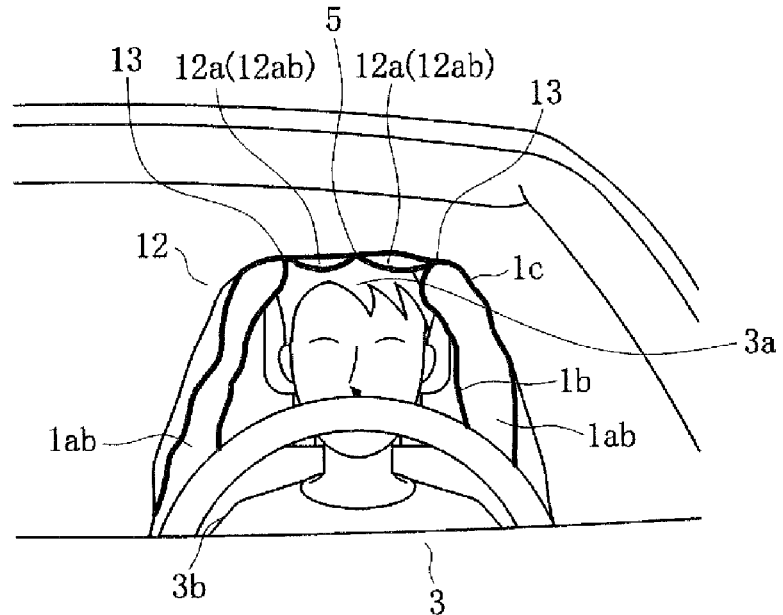
FIG. 2B is the airbag illustrated in FIG. 2A(b) in an initial expanded and deployed state and illustrates a cross-section of the portion positioned above the head of the occupant as viewed from the front of the vehicle.
Figure 2C:
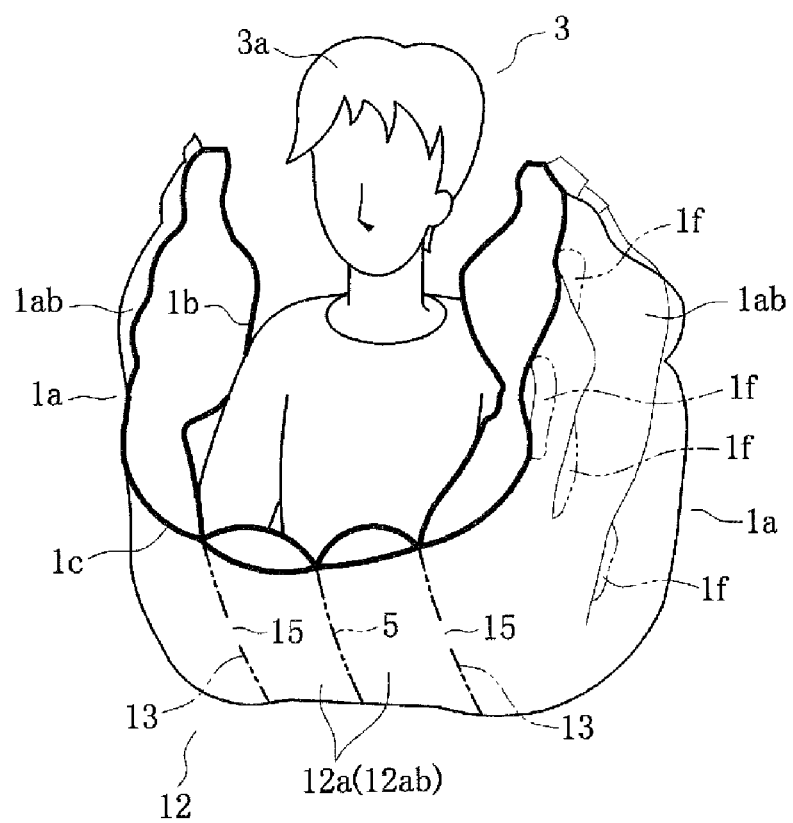
FIG. 2C is a perspective view of the airbag illustrated in FIG. 2A(b) when expansion and deployment are completed and is an illustration with the portion that protects the head of the occupant partially omitted.

(Embodiment 2: FIG. 2A to FIG. 2C)

In Embodiment 2 of the present invention, along with providing the sewing 5 at the center of the airbag 12 in the left-right direction constituting Embodiment 1, a gap 14 is provided at which, for example, an outer periphery of an upper end section of the lines of sewing 13 do not join with the sewing 4 (see FIG. 2A(a)). Alternatively, along with providing the sewing 5 at the center of the airbag 12 constituting Embodiment 1 in the left-right direction, a gap 15 is formed, for example, on an upper side of the lines of sewing 13 (see FIG. 2A(b)).

In the case of Embodiment 2, the coupling section 12a forms delay chamber sections 12ab to which air is supplied from the side protecting chambers 1ab through the gap 14 or 15, which serve as inner vents. The sewing 4 is an example of "an outer peripheral seam", the lines of sewing 13 in FIG. 2A(a) are an example of "independent seams that do not join with an outer peripheral seam", and the sewing 13 in FIG. 2A(b) is an example of "independent seams that join with an outer peripheral seam".

Therefore, when complete expansion and deployment of the coupling section 12a is more temporally delayed than for the side protecting chambers 1ab, the coupling section 12a is thinner than the side protecting chambers 1ab during initial expansion and deployment (see FIG. 2B) and heavy interference of the coupling section 12a and the head 3a of the occupant 3 is suppressed. Furthermore, as illustrated in FIG. 2C, when expansion and deployment are complete, the airbag 12 (coupling section 12a) reliably deploys to the front of the occupant 3, forming a state that covers an upper body portion including the head 3a. While complete expansion and deployment is more delayed than for the side protecting chambers lab, the delay chamber sections 12ab protect the front sides of the head 3a and the chest of the occupant 3. The length of the temporal delay of the expansion and deployment of the coupling section 12a (delay chamber sections 12ab) can be controlled by changing the size of the gap 14 or 15, for example, which serve as the inner vents.

(Embodiment 3 and Embodiment 4: FIG. 3A to FIG. 3C and FIG. 4A to FIG. 4C)

In Embodiment 3 and Embodiment 4 of the present invention, an additional base fabric 16 is attached to a portion of the two base fabrics 1b and 1c constituting the airbag 12, which forms the coupling section 12a of Embodiment 1 or Embodiment 2, for example, by the sewing 4 and 13.

Herein, in Embodiment 3, the additional base fabric 16 is attached to the outside (occupant side) of the base fabric 1b, which is on the occupant side during expansion and deployment. In addition, in Embodiment 4, the additional base fabric 16 is attached to the outside (side opposite the occupant) of the base fabric 1c, which is on the side opposite the occupant during expansion and deployment.

Figure 3A:
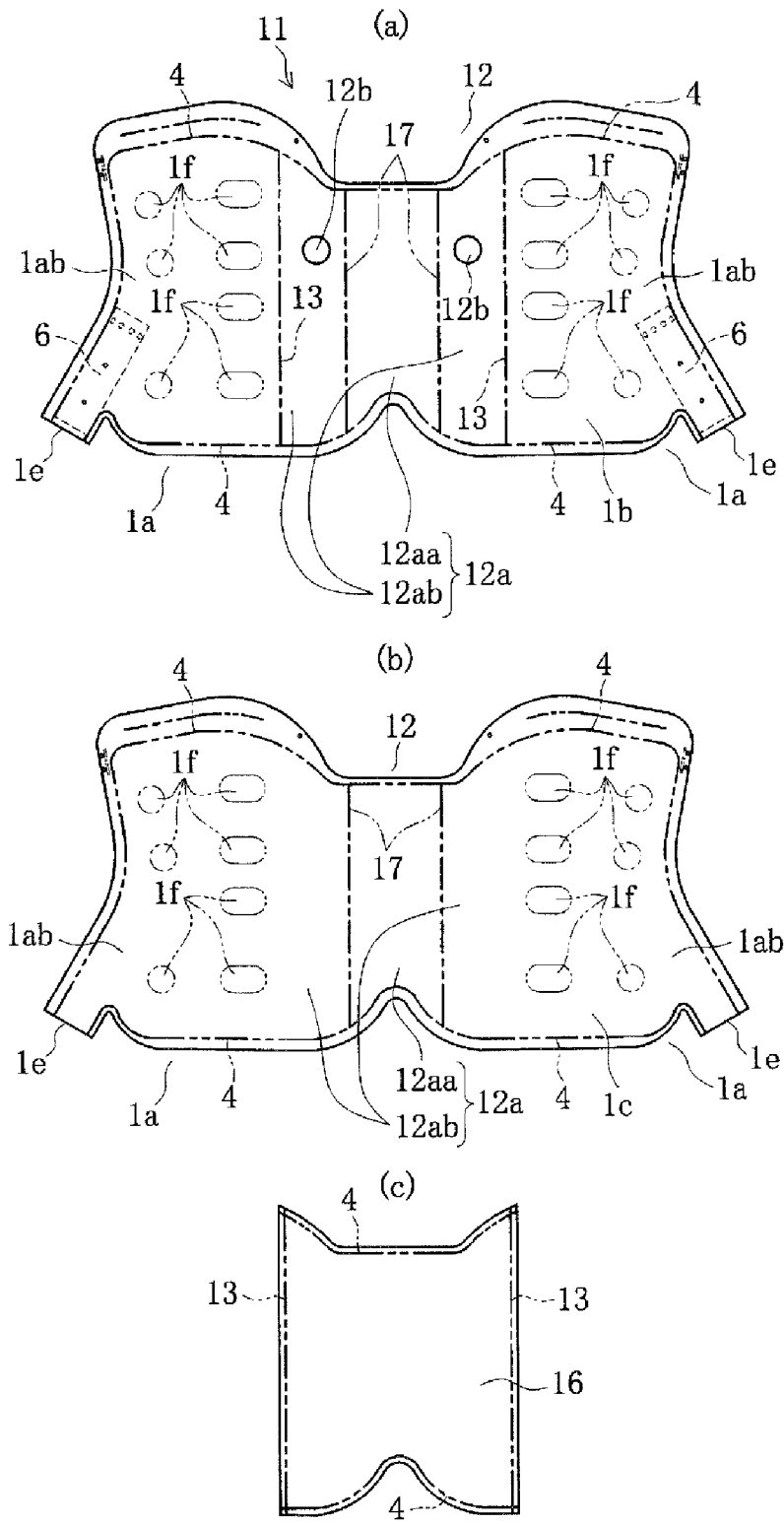
FIG. 3A illustrates the base fabric of Embodiment 3 of the airbag constituting the airbag device of the present invention in an unfolded state (state prior to folding) laid flat on a flat surface, where (a) illustrates the base fabric on the occupant side, (b) illustrates the base fabric opposite the occupant side, and (c) illustrates the additional base fabric.
Figure 3B:
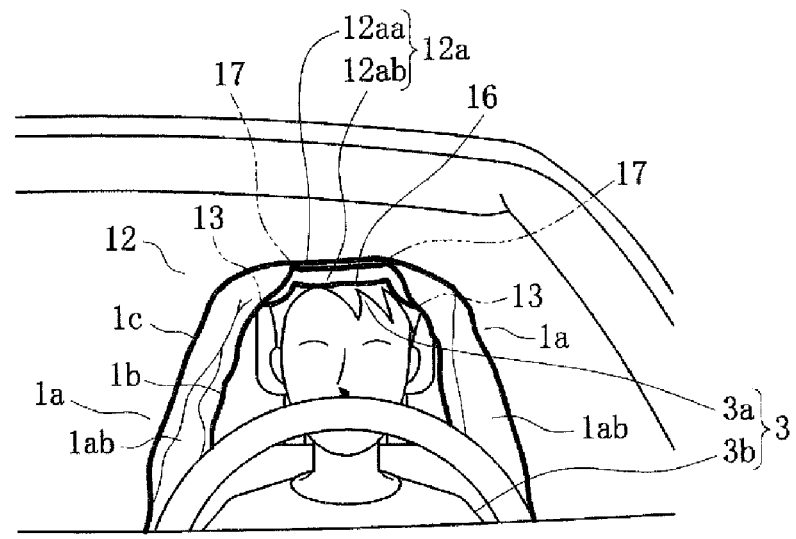
FIG. 3B illustrates the airbag in FIG. 3A during initial expansion and deployment, illustrating a cross-section of a portion positioned above the head of the occupant and viewed from the front of the vehicle.
Figure 4A:
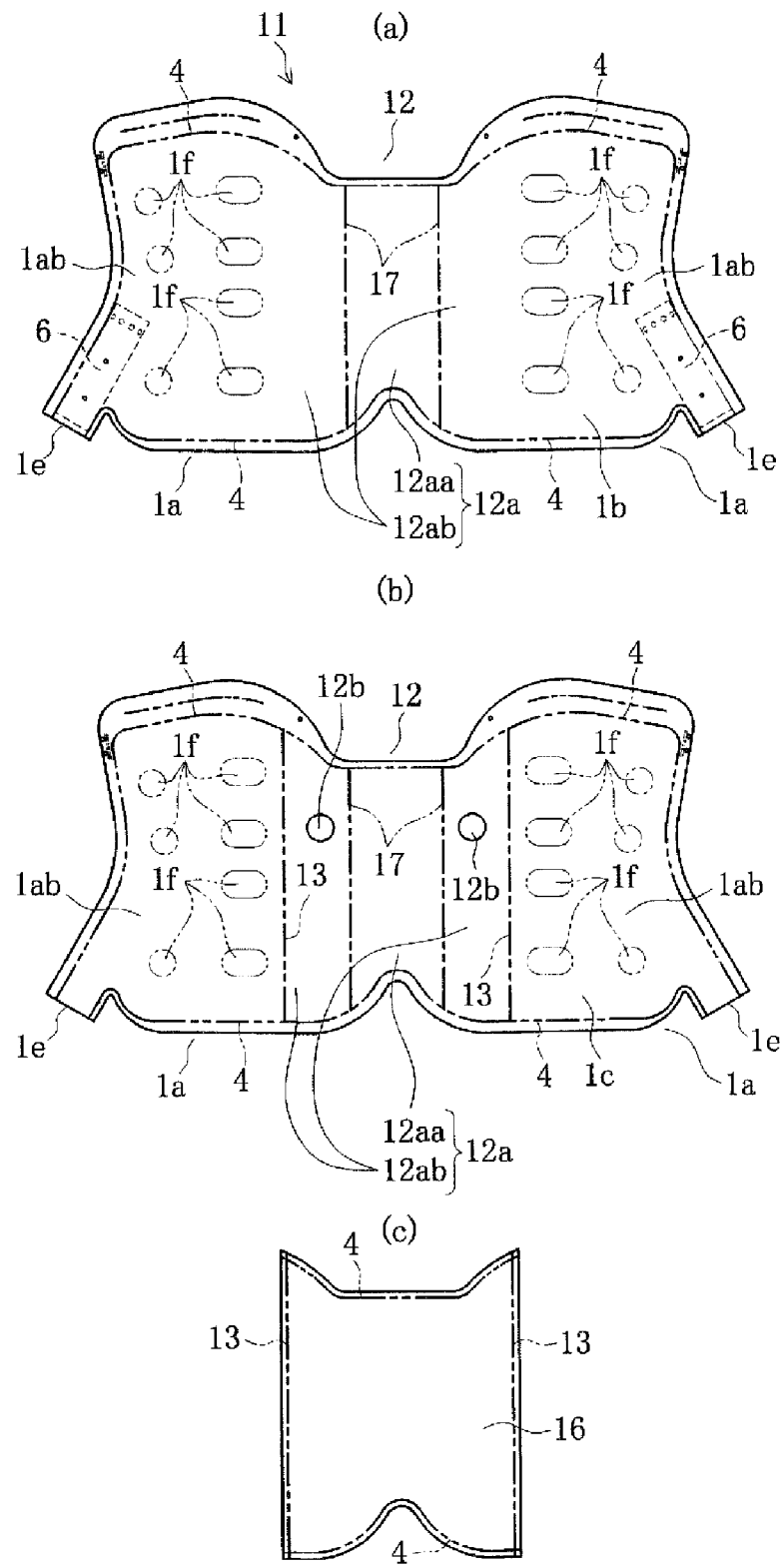
FIG. 4A illustrates Embodiment 4 of the airbag constituting the airbag device of the present invention in the same state as in FIG. 3A.
Figure 4B:
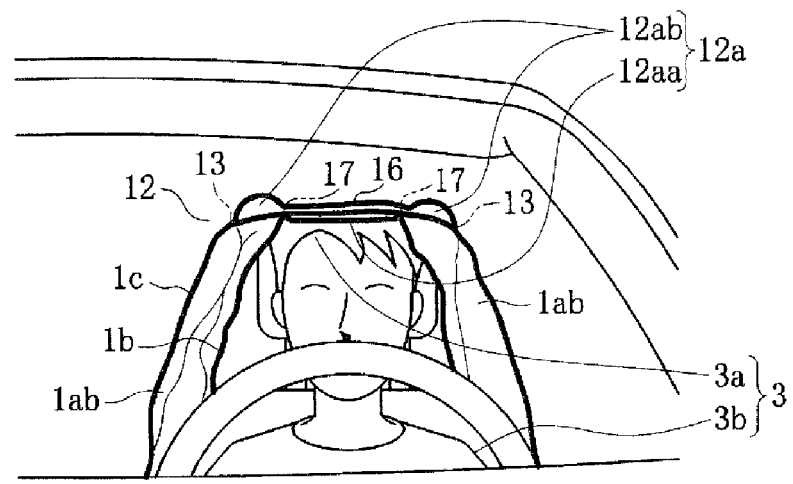
FIG. 4B illustrates Embodiment 4 that is illustrated in FIG. 4A in the same state as in FIG. 3B.

Furthermore, in Embodiment 3, the base fabric 1b is sewn 17 to the base fabric 1c as illustrated in FIG. 3A(b) at the sides of the center in the left-right direction even more centrally than the sewing 13 illustrated in FIG. 3A(a), forming the non-expanding section 12aa of which a center portion in the left-right direction between both of the base fabrics 1b and 1c demarcated by the sewing 4 at an outer periphery joined with the sewing 17 does not expand. Moreover, in Embodiment 4, the base fabric 1c is sewn 17 with the base fabric 1b as illustrated in FIG. 4A(a) at the sides of the center in the left-right direction even more centrally than sewing 13 illustrated in FIG. 4A(b), forming the non-expanding section 12aa of which a center portion in the left-right direction between both of the base fabrics 1b and 1c demarcated by the sewing 4 on an outer periphery joined with the sewing 17 does not expand.

Additionally, in Embodiment 3, a pair of inner vents 12b are provided at sections of the base fabric 1b, which is on the occupant side during expansion and deployment, on both outer sides of the non-expanding sections 12aa in the left-right direction. Further, in Embodiment 4, the pair of inner vents 12b are provided at portions of the base fabric 1c, which is on the side opposite the occupant during expansion and deployment, on both outer sides of the non-expanding sections 12aa in the left-right direction. As illustrated in FIG. 3A(a) and FIG. 4A(b), the inner vents 12b are provided on the portion of the base fabrics 1b and 1c covered by the additional base fabric 16.

That is, in Embodiment 3 and Embodiment 4, the base fabric 1b, which is on the occupant side during expansion and deployment, the base fabric 1c, which is on the side opposite the occupant during expansion and deployment, and the additional base fabric 16 form the coupling section 12a.

Furthermore, the coupling section 12a consists of the non-expanding sections 12aa positioned at a center portion in the left-right direction of both of the base fabrics 1b and 1c, and the delay chamber sections 12ab formed by either the base fabric 1b or 1c and the additional base fabric 16.

For Embodiment 3 and Embodiment 4, during expansion and deployment of the airbag 12, air is supplied from the side protecting chambers lab through the inner vents 12b to the delay chamber sections 12ab only.

Figure 3C:
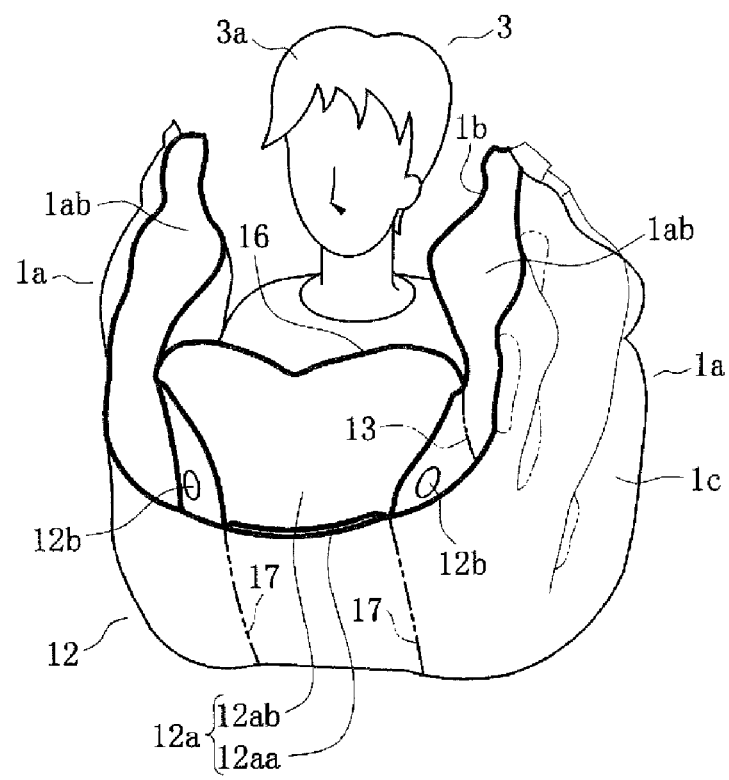
FIG. 3C is a perspective view of the airbag illustrated in FIG. 3A when expansion and deployment are complete, illustrated such that the portion that protects the head of the occupant is partially omitted.
Figure 4C:
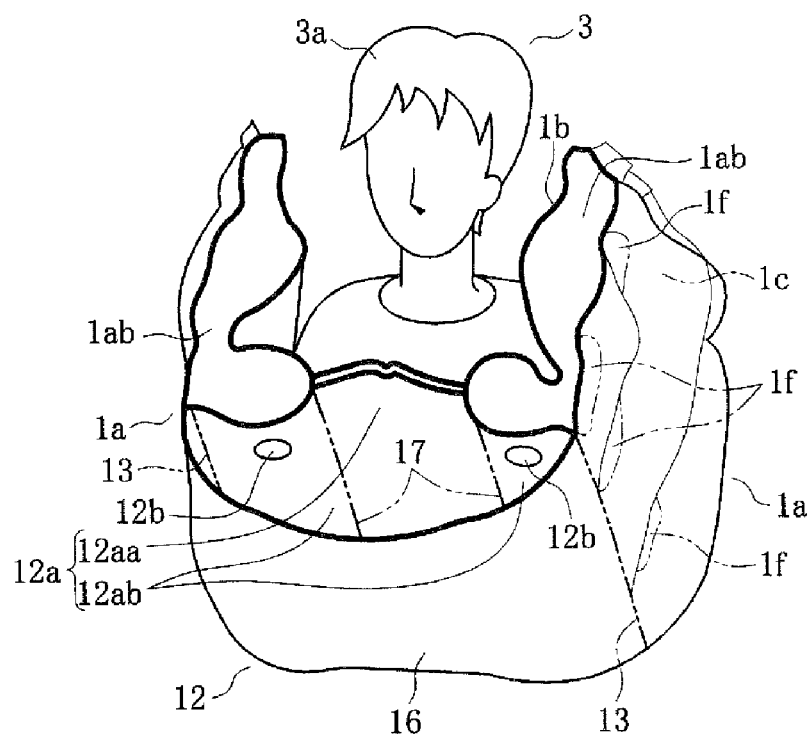
FIG. 4C illustrates Embodiment 4 that is illustrated in FIG. 4A in the same state as in FIG. 3C.

Therefore, expansion and deployment of the delay chamber sections 12ab are more temporally delayed than for the side protecting chambers 1ab, the delay chamber sections are thinner during initial expansion and deployment than the side protecting chambers 1ab (see FIG. 3B and FIG. 4B), and interference of the coupling section 12a and the head 3a of the occupant 3 is suppressed. Furthermore, as illustrated in FIG. 3C and FIG. 4C, when expansion and deployment are complete, the airbag 12 (coupling section 12a) reliably deploys to the front of the occupant 3 and takes on a state covering the upper body portion including the head 3a. Note that although air is not supplied to the non-expanding sections 12aa, air is supplied between additional base fabric 16 and the base fabric 1b or 1c formed by the sewing 4 and the sewing 13, so the coupling section 12a of Embodiment 3 and Embodiment 4 is substantially composed of the delay chamber sections 12ab and protects the front sides of the head 3a and the chest of the occupant 3 when expansion and deployment are complete (see FIG. 3B, FIG. 3C, FIG. 4B, and FIG. 4C).

Needless to say, while the present invention is not limited to the aforementioned examples, the embodiments may be appropriately changed within the scope of the technical concepts described in each claim.

In other words, the airbag device described above is a preferred example of the present invention, and Embodiments other than those described also may be implemented or executed via a variety of methods. Unless otherwise specified in the specification of the present application, there are no limitations to the shape, size, configuration, arrangement, and the like of the components illustrated in the attached drawings in the present invention. Furthermore, expressions and terms used in the specification of the present application are for the purpose of description and are not limiting unless otherwise specified.

For example, in Embodiment 2 in FIG. 2A(a), the upper end sections of the sewing 13 demarcating the side protecting chambers 1ab and coupling sections 12a and the sewing 4 on the outer periphery are illustrated as not being joined; however, it is acceptable if the lower end sections of the sewing 13 and the sewing 4 on the outer periphery are not joined. In addition, it is also acceptable if the upper end sections and the lower end sections of the sewing 13 are not joined with the sewing 4 on the outer periphery.

Moreover, in Embodiment 2 illustrated in FIG. 2A(b), one of a gap 15 is illustrated as being provided at an upper side of the sewing 13 demarcating the side protecting chambers 1ab and the coupling sections 12a; however, the gap 15 is not limited to one, and the provided position thereof is likewise not limited to the upper side and may be at a center portion or a lower side.

Figure 5:
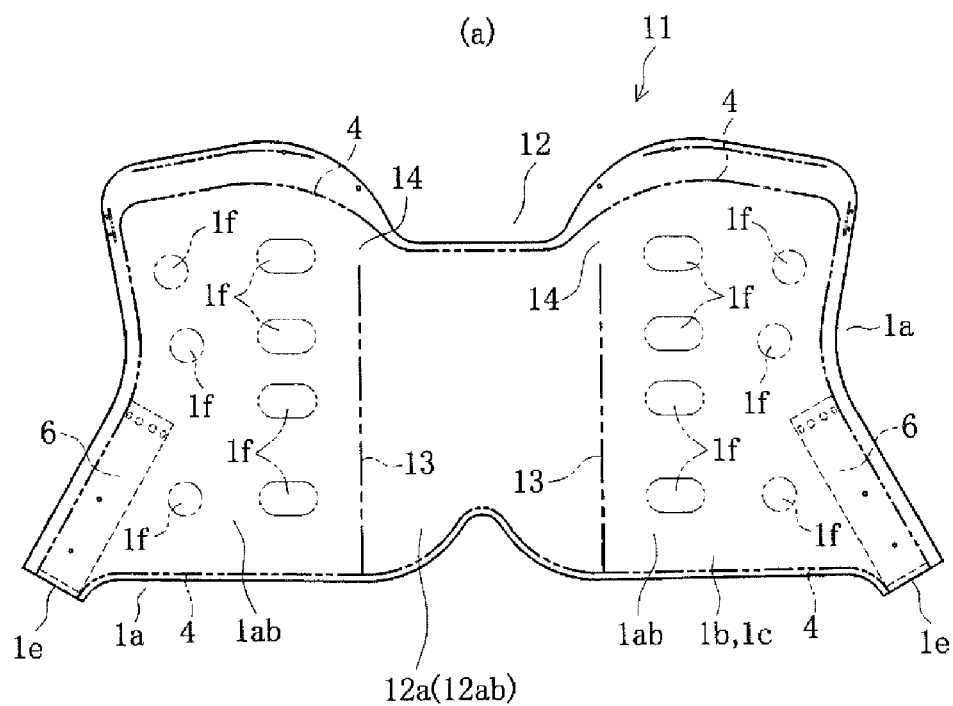
FIG. 5 illustrates drawings of Modified Example 1 of Embodiment 2 of the airbag constituting the airbag device of the present invention in an unfolded state (state prior to folding) laid flat on a flat surface, where (a) illustrates a gap formed between the independent seam and the outer peripheral seam and (b) illustrates a gap formed in the independent seam.
Figure 5:
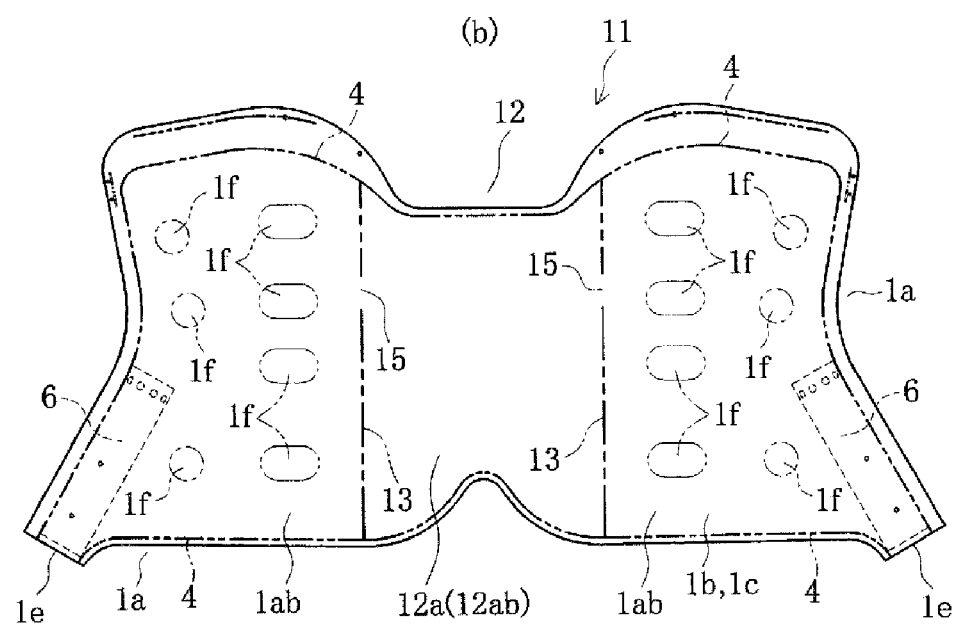
Figure 6:
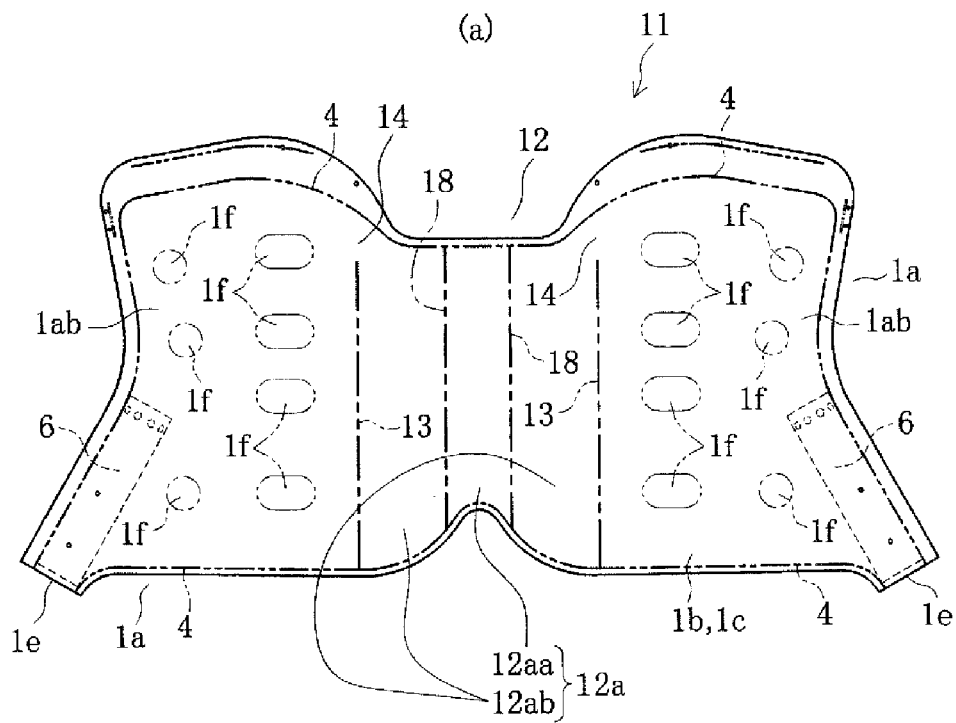
FIG. 6 illustrates Modified Example 2 of Embodiment 2 of the airbag constituting the airbag device of the present invention in the same state as in FIG. 5.
Figure 6:
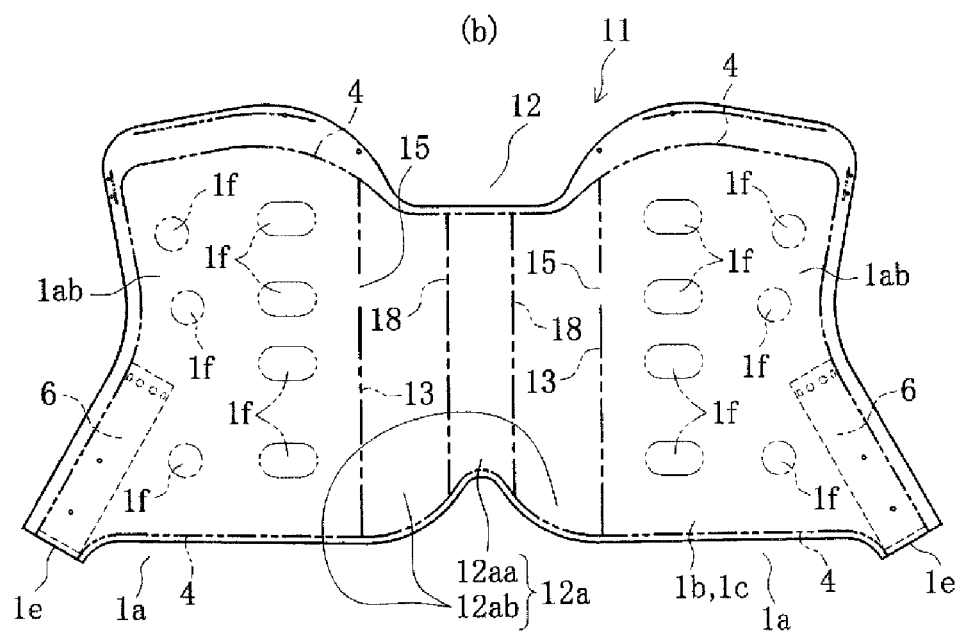

Also, in Embodiment 2 illustrated in FIG. 2A(a) and (b), the sewing 5 is illustrated as being provided at the center in the left-right direction; however, as illustrated in FIGS. 5(a) and (b), one delay chamber section 12ab may be formed at a center portion in the left-right direction without the sewing 5 at the center in the left-right direction. Additionally, as illustrated in FIGS. 6(a) and (b), two seams 18 having an appropriate space therebetween may be provided on a center portion in the left-right direction without the sewing 5 at the center in the left-right direction, and the interval between these seams 18 may form the non-expanding sections 12aa. The seams 18 in the Modified Example illustrated in FIGS. 6(a) and (b) are one example of the "seam that joins with the outer peripheral seam".

In addition, Embodiment 3 illustrated in FIG. 3A and Embodiment 4 illustrated in FIG. 4A have the non-expanding sections 12aa formed in the coupling section 12a by both the base fabrics 1b and 1c and the delay chamber sections 12ab formed by one of the base fabrics 1b or 1c and the additional base fabric 16.

Figure 7:
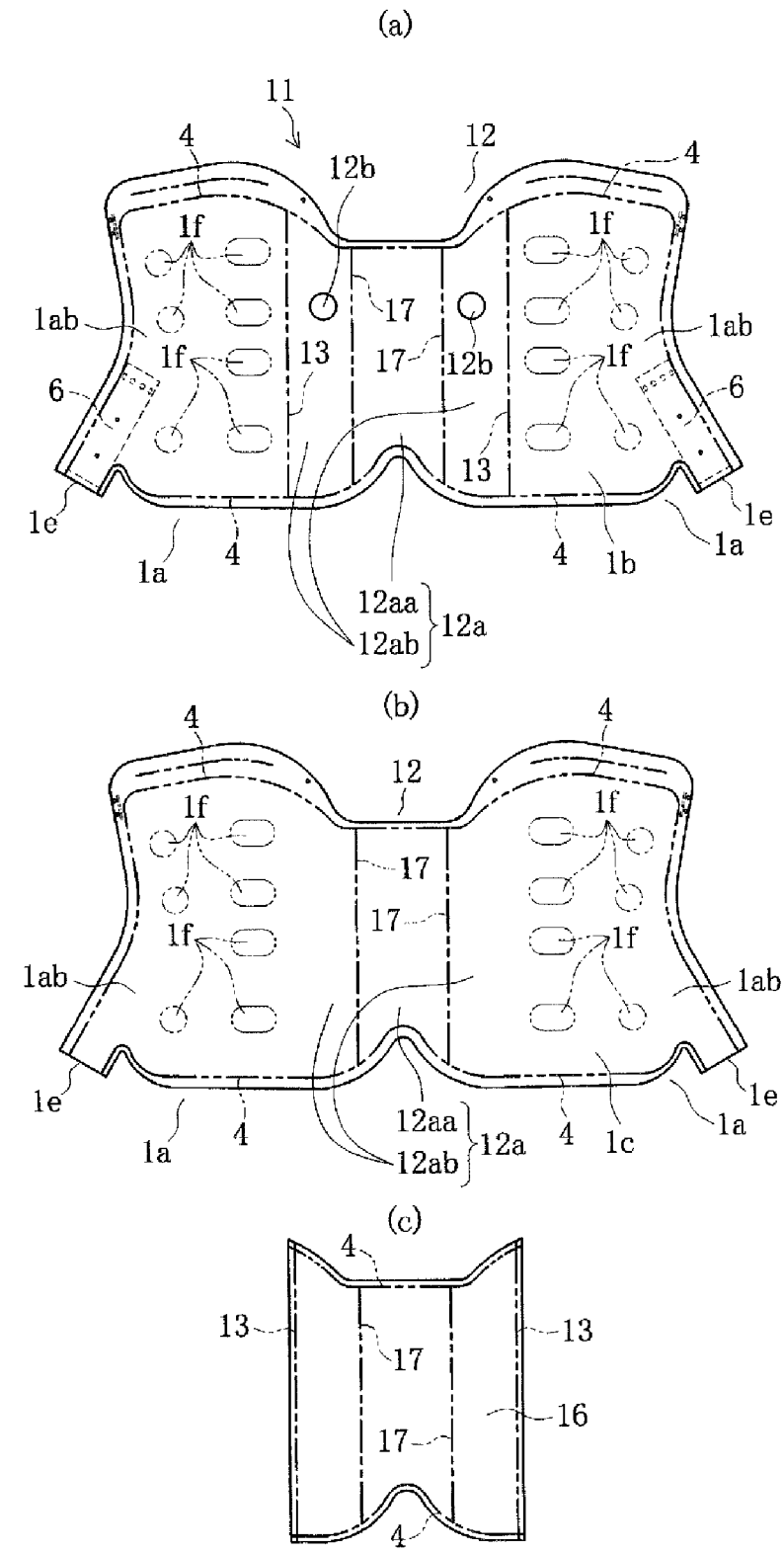
FIG. 7 illustrates a base fabric of a Modified Example of Embodiment 3 of the airbag constituting the airbag device of the present invention in an unfolded state (state prior to folding) laid flat on a flat surface, where (a) illustrates the base fabric on the occupant side, (b) illustrates the base fabric on the side opposite the occupant, and (c) illustrates the additional base fabric.
Figure 8:
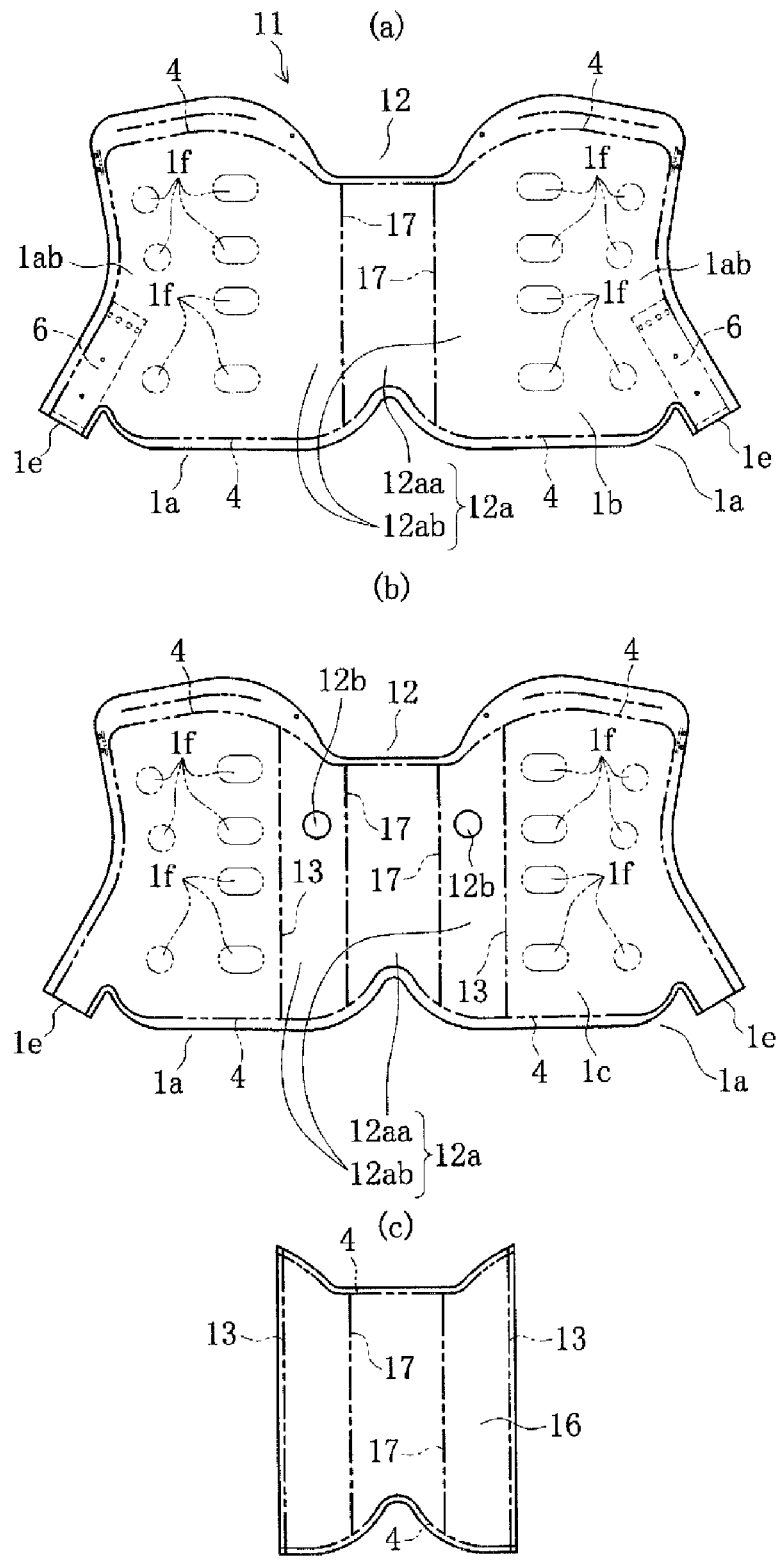
FIG. 8 is a drawing illustrating a Modified Example of Embodiment 4 of the airbag constituting the airbag device of the present invention in the same state as in FIG. 7.

However, in addition to the base fabric 1b and the base fabric 1c, the additional base fabric 16 may also be subjected to the sewing 17 at the same time to form the non-expanding sections 12aa (see FIG. 7 and FIG. 8).

Moreover, with the airbag device 11 of the present invention, the airbag 12 is not limited to being stowed in the backrest section 2a of the vehicle seat 2 rolled in a roll shape but may be stowed in the backrest section 2a in a state of being folded in a bellows shape.

Also, in the airbag device 11 of the present invention, when stowing the airbag 12 in the backrest section 2a of the vehicle seat 2, as illustrated in FIG. 9, the side protecting chambers 1ab are not limited to being attached to an outer side in the left-right direction of the frame 2b, and may be attached to an inner side in the left-right direction of the frame 2b. Furthermore, the inflators 6 may also be mounted on either the inner side or outer side of the frame 2b in the left-right direction.

In addition, Embodiment 1 to Embodiment 4 describe the airbag device 11 in which the head 3a of the occupant 3 and the side sections 3b of the shoulders, upper arms, and chest of the occupant 3 are protected. However, the present invention may be applied to an airbag device that protects the head 3a of the occupant 3 and the shoulders, upper arms, and chest of the occupant 3 as well as the side sections of the abdomen and waist of the occupant 3.

Moreover, in Embodiment 1 to Embodiment 4, the chambers 1a on the left and right are expanded and deployed by the inflators 6 provided on the left and right; however, if the chambers 1a on the left and right are made to expand and deploy independently, one inflator 6 may supply gas to the chambers 1a on the left and right.

Additionally, the airbag 12 described by Embodiment 1 to Embodiment 4 is sewn and formed using the two base fabrics 1b and 1c or the two base fabrics 1b and 1c and the additional base fabric 16. However, adhesion, welding, or the like may be used as long as the two base fabrics 1b and 1c or the two base fabrics 1b and 1c and the additional base fabric 16 can be firmly bonded together. Also, the so-called "one-piece weaving" technique may be used for formation.

In the aforementioned Embodiments, the airbag device 11 is attached to the vehicle seat 2 on which the seated occupant is facing the front of the vehicle, however, the airbag device 11 may be attached to the vehicle seat 2 that enables a seated occupant to face the rear of the vehicle. Such a vehicle seat 2 may be provided in self-driving vehicles and the like.

DESCRIPTION OF CODES

1a: Chamber
1ab: Side part protection chamber
1b, 1c. Base fabric
2. Vehicle seat
3. Occupant
3a. Head
3b: Side portion
4. Sewing
6. Inflator
11. Airbag device
12. Airbag
12a: Coupling part
12aa. Non-expanding section
12ab. Delay chamber section
12b. Inner vent
13. Sewing
14. Gap
15. Gap
16. Additional base fabric
17. Sewing
18. Sewing

The invention claimed is:
1. An airbag device, the airbag device comprising:
an airbag configured to expand and deploy for integrally covering the head and side sections of an occupant seated on a vehicle seat, and
an inflator that supplies gas to the airbag, wherein
the airbag has a pair of chambers coupled by a coupling section positioned to the sides of the center of the vehicle seat in the left-right direction that deploy forward of the occupant when expansion and deployment are complete,
the pair of chambers independently expand and deploy frontward from both the left and right sides of the vehicle seat during expansion and deployment, there being a pair of side protecting chambers adapted to cover at least the side sections of the occupant,
the side protecting chambers are coupled by the coupling section, and
the coupling section has a constant thickness throughout and is configured so as to be thinner than the side protecting chambers at least during initial expansion and deployment.

2. The airbag device according to claim 1, wherein the coupling section is composed of a non-expanding section throughout.

3. The airbag device according to claim 1, wherein the coupling section has a delay chamber section where complete expansion and deployment by gas supplied through inner vents connected to the side protecting chambers is more temporally delayed than for the side protecting chambers.

4. The airbag device according to claim 3, wherein the delay chamber section includes a left-right pair of expanding sections, and gas from the inner vents, provided to the sides of the center in the left-right direction of the vehicle seat in the side protecting chambers, is supplied to the expansion sections.

5. The airbag device according to claim 3, wherein the airbag is composed of at least two base fabrics, independent seams that do not join with an outer peripheral seam are formed at a boundary of the respective side protecting chambers and the delay chamber section, and gaps between these independent seams and the outer peripheral seam form inner vents.

6. The airbag device according to claim 3, wherein the airbag is composed of at least two base fabrics, independent seams are formed that join with an outer peripheral seam at a boundary of the respective side protecting chambers and the delay chamber section, and gaps that serve as inner vents are formed in the independent seams.

7. The airbag device according to claim 3, wherein the airbag has two base fabrics that form the side protecting chambers and has an additional base fabric that forms the delay chamber section with either one of the two base fabrics, which is on the occupant side or the side opposite the occupant during expansion and deployment, the inner vents being provided at a portion of the base fabric covered by the additional base fabric.

8. The airbag device according to claim 1, wherein the coupling section has both a non-expanding section and a delay chamber section for which complete expansion and deployment by gas supplied through inner vents connected to the side protecting chambers is more temporally delayed than for the side protecting chambers.

9. The airbag device according to claim 8, wherein the airbag is composed of at least two base fabrics, and whereas a gap-formed at a boundary of the respective side protecting chambers and the delay chamber section, between an outer peripheral seam and independent seams that do not join with the outer peripheral seam-serves as an inner vent, and the non-expanding section is formed by forming a seam that joins with the outer peripheral seam at the sides of the center in the left-right direction of the independent seam.

10. The airbag device according to claim 8, wherein the airbag is composed of at least two base fabrics, and whereas a gap—formed at a boundary of the respective side protecting chambers and the delay chamber section—is formed as an inner vent in an independent seam that joins with an outer peripheral seam, and the non-expanding section is formed by forming a seam that joins with the outer peripheral seam at the sides of the center in the left-right direction of the independent seam.

11. The airbag device according to claim 8, wherein the airbag has two base fabrics that form the side protecting chambers and has an additional base fabric that forms a delay chamber section with either one of the two base fabrics, which is on the occupant side or the side opposite the occupant during expansion and deployment, the inner vents are provided at a portion of the base fabric covered by the additional base fabric, and the non-expanding section is formed by the two base fabrics, which form the side protecting chambers, or is formed by the two base fabrics and the additional base fabric.

12. The airbag device according to claim 1, wherein the airbag further includes first and second seams extending across the airbag in a first direction and spaced apart from one other in a second direction, the second direction perpendicular to the first direction.

13. The airbag device according to claim 12, wherein the first and second seams define the boundaries of an uninflatable section of the airbag in the second direction.

14. The airbag device according to claim 13, wherein the airbag has a shortest dimension in the first direction at a centerline extending in the first direction.

15. The airbag device according to claim 1, wherein a first side protecting portion of the pair of side protecting portions is inflated by a first inflator and a second side protecting portion of the pair of side protecting portions is inflated by a second inflator.

16. An airbag device, the airbag device comprising:
an airbag configured to expand and deploy for integrally covering the head and side sections of an occupant seated on a vehicle seat, and
an inflator that supplies gas to the airbag, wherein
the airbag has a pair of chambers coupled by a coupling section positioned to the sides of the center of the vehicle seat in the left-right direction that deploy forward of the occupant when expansion and deployment are complete,
the pair of chambers independently expand and deploy frontward from both the left and right sides of the vehicle seat during expansion and deployment, there being a pair of side protecting chambers adapted to cover at least the side sections of the occupant,
the side protecting chambers are coupled by the coupling section, and
the coupling section is configured so as to be thinner than the side protecting chambers at least during initial expansion and deployment,
wherein the coupling section has a delay chamber section where complete expansion and deployment by gas supplied through inner vents connected to the side protecting chambers is more temporally delayed than for the side protecting chambers, and
wherein the delay chamber section includes a left-right pair of expanding sections, and gas from the inner vents, provided to the sides of the center in the left-right direction of the vehicle seat in the side protecting chambers, is supplied to the expansion sections.

17. An airbag device, the airbag device comprising:
an airbag configured to expand and deploy for integrally covering the head and side sections of an occupant seated on a vehicle seat, and
an inflator that supplies gas to the airbag, wherein
the airbag has a pair of chambers coupled by a coupling section positioned to the sides of the center of the vehicle seat in the left-right direction that deploy forward of the occupant when expansion and deployment are complete,
the pair of chambers independently expand and deploy frontward from both the left and right sides of the vehicle seat during expansion and deployment, there being a pair of side protecting chambers adapted to cover at least the side sections of the occupant,
the side protecting chambers are coupled by the coupling section, and the coupling section is configured so as to be thinner than the side protecting chambers at least during initial expansion and deployment, wherein the coupling section has a delay chamber section where complete expansion and deployment by gas supplied through inner vents connected to the side protecting chambers is more temporally delayed than for the side protecting chambers, and wherein the airbag is composed of at least two base fabrics, independent seams that do not join with an outer peripheral seam are formed at a boundary of the respective side protecting chambers and the delay chamber section, and gaps between these independent seams and the outer peripheral seam form inner vents.

* * * * *